Dec. 9, 1969   R. C. MEYERS   3,483,453
ENERGY STORAGE CAPACITORS
Filed Sept. 18, 1968   3 Sheets-Sheet 1

Inventor
Ralph C. Meyers
By Thomas E Torphy
Attorney

Dec. 9, 1969  R. C. MEYERS  3,483,453
ENERGY STORAGE CAPACITORS
Filed Sept. 18, 1968  3 Sheets-Sheet 2
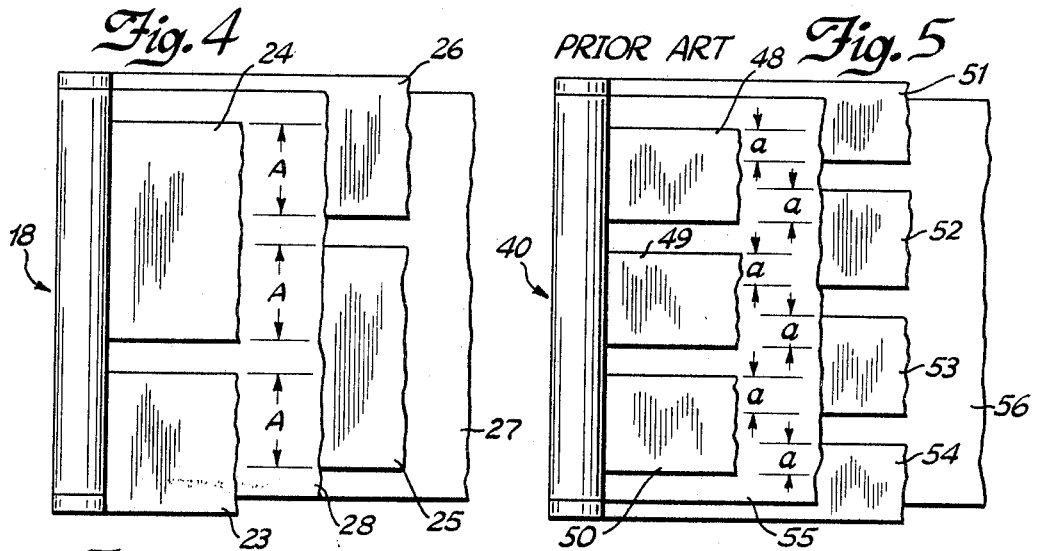
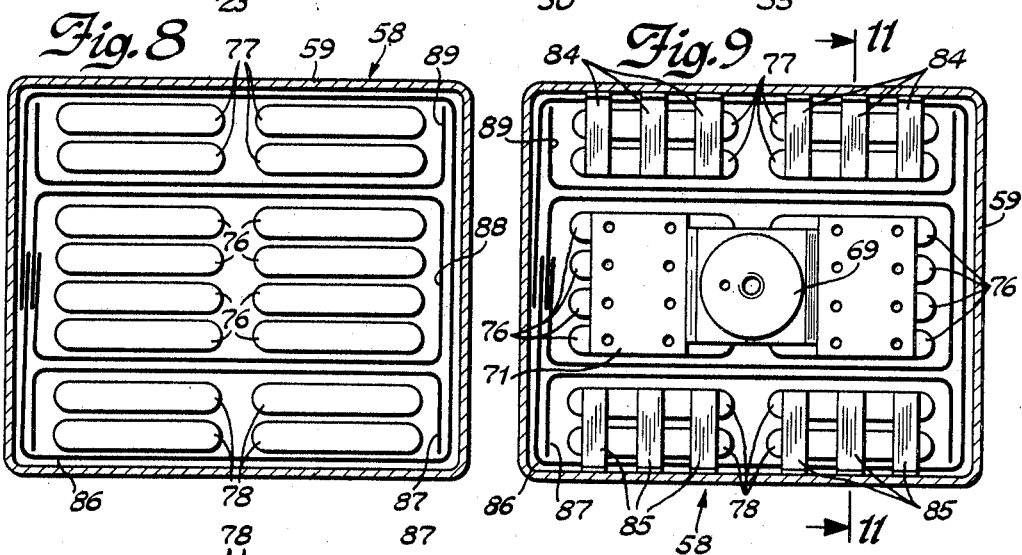
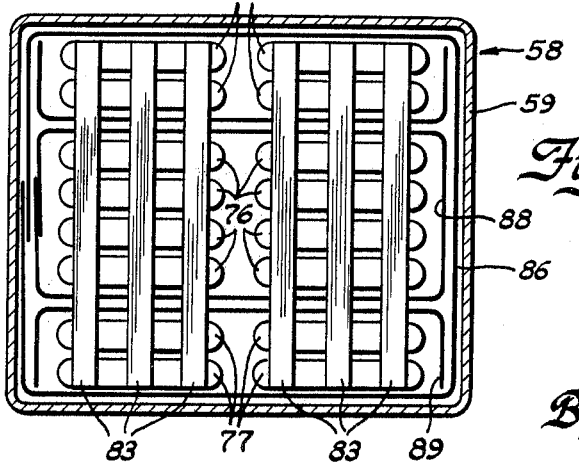
Inventor
Ralph C. Meyers
By Thomas E. Torphy
Attorney

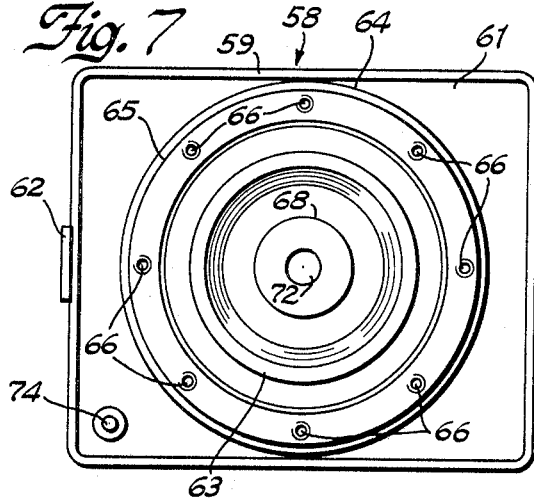
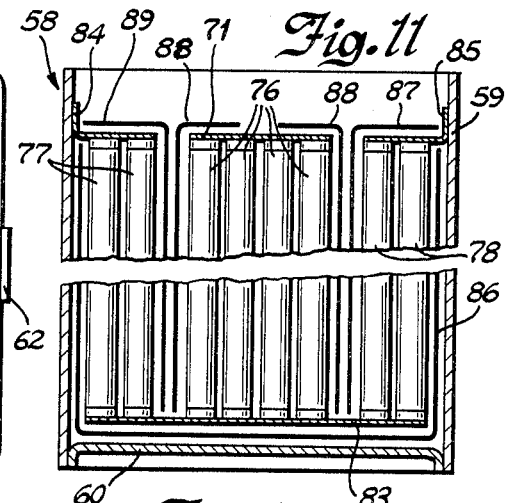
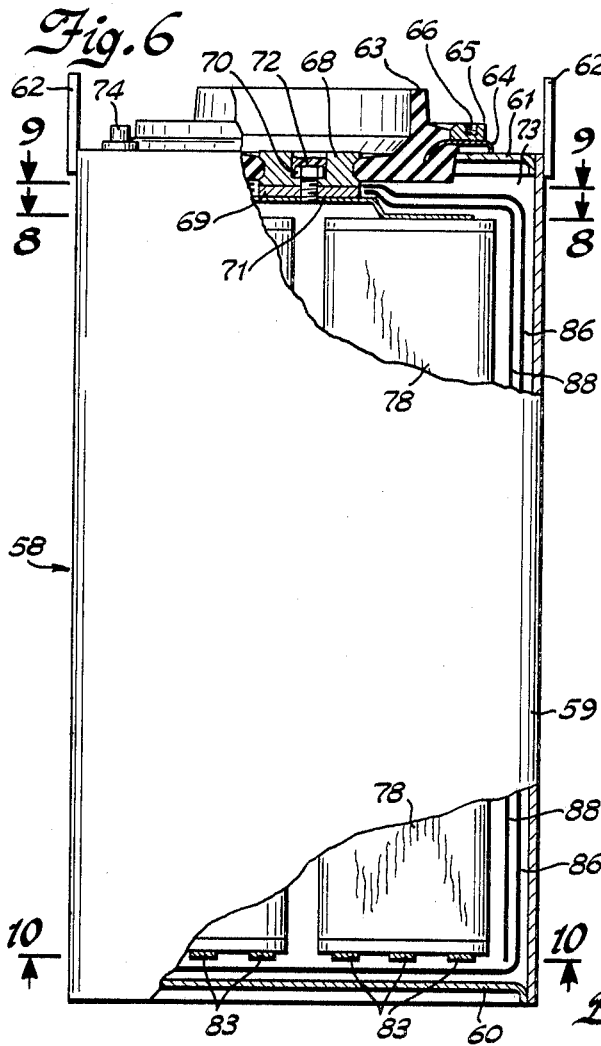
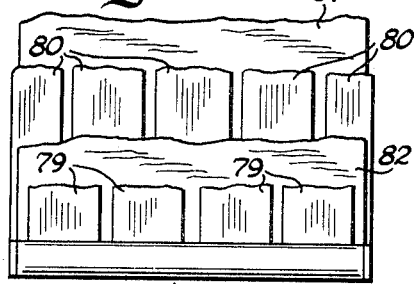
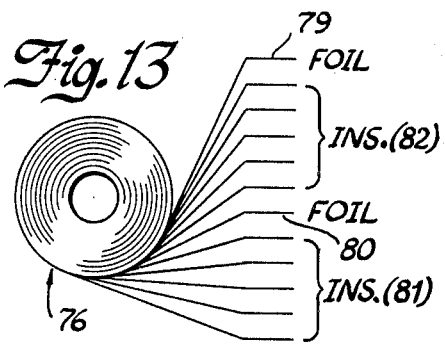

United States Patent Office 3,483,453
Patented Dec. 9, 1969

1

3,483,453
ENERGY STORAGE CAPACITORS
Ralph C. Meyers, New Berlin, Wis., assignor to McGraw-Edison Company, Milwaukee, Wis., a corporation of Delaware
Filed Sept. 18, 1968, Ser. No. 760,645
Int. Cl. H01g 1/00
U.S. Cl. 317—260     6 Claims

ABSTRACT OF THE DISCLOSURE

A capacitor construction for a liquid impregnated energy storage capacitor having a plurality of capacitor packs enclosed in a conductive enclosure. Each of the capacitor packs is series wound. The packs are arranged within the disclosure to provide a current path away from the terminal end of the capacitor and divided return paths. The outgoing current path is located substantially centrally between the return paths.

BACKGROUND OF THE INVENTION

The invention relates to electrical capacitors and, more particularly, to the construction of high voltage energy storage capacitors.

In certain applications it is desirable that energy storage capacitors have as low an inductance as possible so that the stored energy may be withdrawn rapidly. In an electrical device such as we are now considering the inductance is a function of dimension and depends on the separation between the outgoing and return current paths, the smaller the separation the lower the inductance.

In prior capacitor construction low inductance capacitors were commonly constructed with capacitor pack windings which had foils extending beyond the insulating sheets which separated the foils. The foils of opposite polarity extended from opposite ends of the pack. Connections are made to the extending foils and are connected so that a plurality of packs within a capacitor are arranged in parallel. The connections through the foil windings are routed to capacitor terminals in such a way as to cause them to be as nearly coaxial as possible within the limitations of rectangular geometry in order to minimize the inductance of the capacitor. In low voltage capacitors, for instance five to ten kv., one insulating section is adequate to withstand the voltage. Higher voltage capacitors commonly incorporate several series sections in each pack winding. As will hereinafter be demonstrated, it is advantageous to use as few series sections as possible since there is more waste space in windings with many series sections. This waste comes about as a result of the spacing of the foils. In capacitors of substantially similar physical dimensions and current path separation the inductances will be substantially the same. If the waste space within the capacitor can be reduced, the capacitance of a given sized capacitor may be increased. The amount of energy that may be stored within the capacitor depends on the capacitance. Therefore, if the volumetric efficiency can be increased, the capacitor will have a smaller ratio of inductance to capacitance or stored energy, and the stored energy may be more quickly released.

It is also desirable to reduce the number of series sections within a given sized pack to reduce the problems of winding the foils and to increase the reliability of the foil separation.

SUMMARY OF THE INVENTION

It is, therefore, an object of the invention to provide a capacitor construction which will operate at high voltage, yet minimize the number of series sections in each pack

2 winding so as to maximize the active foil area per unit of volume.

It is a further object of the invention to provide a capacitor with increased capacitive volumetric efficiency without sacrificing low inductance characteristics.

It is still another object of the invention to provide a capacitor construction which increases the reliability of the capacitor and facilitates the winding of packs.

Other objects and advantages of the invention will become apparent upon reference to the following description.

These objects are accomplished by providing a capacitor having an enclosure, terminal means and a plurality of wound capacitor packs arranged in side-by-side relation within the enclosure. The packs are arranged within the enclosure to provide a substantially central outgoing path and a plurality of return current paths on either side of the outgoing current path. For this purpose connections are made at one end of the pack assembly so as to connect the outgoing and return paths in series relationship. Each of the paths may comprise a plurality of packs, and each pack may be series wound. At the other end of the pack assembly connections are made to the terminal means.

With the above-described arrangement the voltage appearing across the capacitor is divided between two series packs and, consequently, each pack needs only half as many series groups to withstand the applied voltage as would be required by a single pack if the full capacitor voltage were applied thereacross. The arrangement also approximates a coaxial current path arrangement so as to minimize the capacitor inductance.

BRIEF DESCRIPTION OF THE DRAWINGS

FIG. 4 illustrates the construction of a pack used in the capacitor of FIG. 1;

FIG. 5 illustrates the construction of a pack used in the capacitor illustrated in FIG. 2;

FIG. 6 is a partially sectional view of another embodiment of the invention;

FIG. 7 is a top view of the capacitor shown in FIG. 6;

FIG. 8 is a top sectional view taken along line 8—8 of FIG. 6;

FIG. 9 is a sectional view taken generally along line 9—9 of FIG. 6;

FIG. 10 is a sectional view taken along line 10—10 of FIG. 6;

FIG. 11 is a sectional view taken along line 11—11 of FIG. 9;

FIG. 12 is a partially broken away view showing the construction of an individual pack used in the capacitor illustrated in FIG. 6; and FIG. 13 is an end view of a pack roll illustrating the construction of a pack used in the capacitor illustrated in FIG. 6.

DESCRIPTION OF THE PREFERRED EMBODIMENTS

Figure 1:
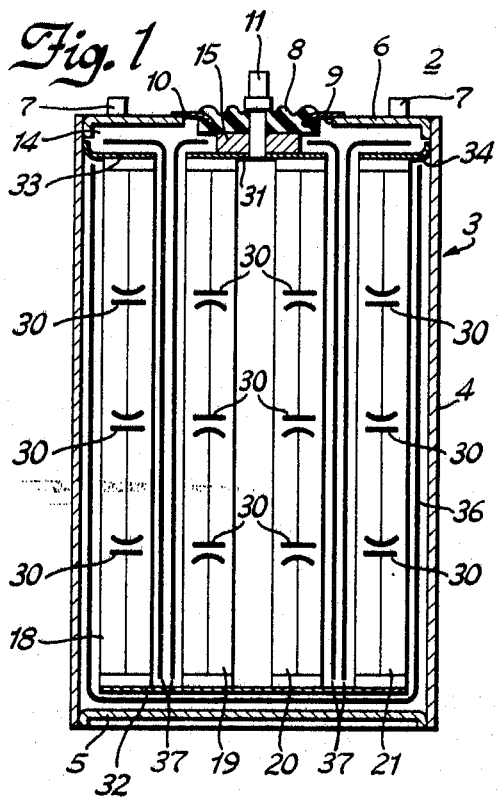
FIG. 1 is a sectional view of a capacitor incorporating the present invention.
Figure 2:
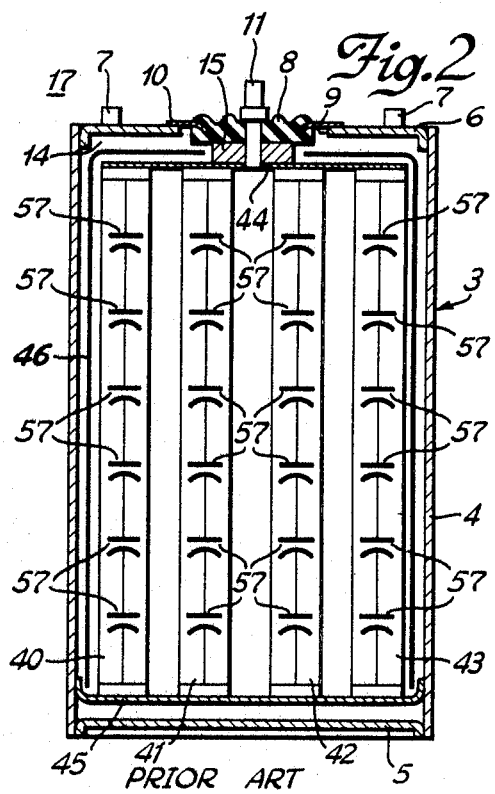
FIG. 2 is a sectional view of a capacitor constructed in accordance with the prior art and intended for purposes similar to that of the capacitor of FIG. 1.

Referring to the drawings, FIG. 1 illustrates a capacitor incorporating the present invention and FIG. 2 illustrates a prior art capacitor intended for similar electrical applications. Certain similar or identical constructional elements will appear in FIGS. 1 and 2, and these elements will be given the same reference numeral.

A capacitor 2, shown in FIG. 1, has a housing 3 comprising a rectangular tank 4 having a bottom member 5 and a cover 6 welded thereto in leakproof fashion. Tank 4, bottom member 5 and cover 6 are preferably made of steel sheet. A plurality of ground terminals 7 are welded to cover 6.

An insulating bushing 8 is accommodated within a central aperture 9 of cover 6. A circular radially extending flange 10 is imbedded at its inner radius in bushing 8 and extends radially over the periphery of aperture 9 and is welded to cover 6 to form a leakproof joint. A terminal 11 extends axially through the center of bushing 8. It is to be understood that all voids and interstices within capacitor 2 as well as other capacitors described herein are filled with a suitable impregnating and insulating substance 14 such as castor oil. It is to be understood that, in the actual construction of capacitors as illustrated herein, the capacitor packs and insulating materials are assembled tightly together, but for clarity of illustration the various elements are shown in exaggerated spaced relationship. A hub 15 is attached to terminal 11 adjacent its lower end.

Thus far, the elements described in capacitor 2 shown in FIG. 1 are similar to those of a capacitor 17 shown in FIG. 2.

Again referring to FIG. 1, four capacitor packs 18, 19, 20 and 21 are shown assembled in generally side-by-side relationship within capacitor 2.

Figure 3:
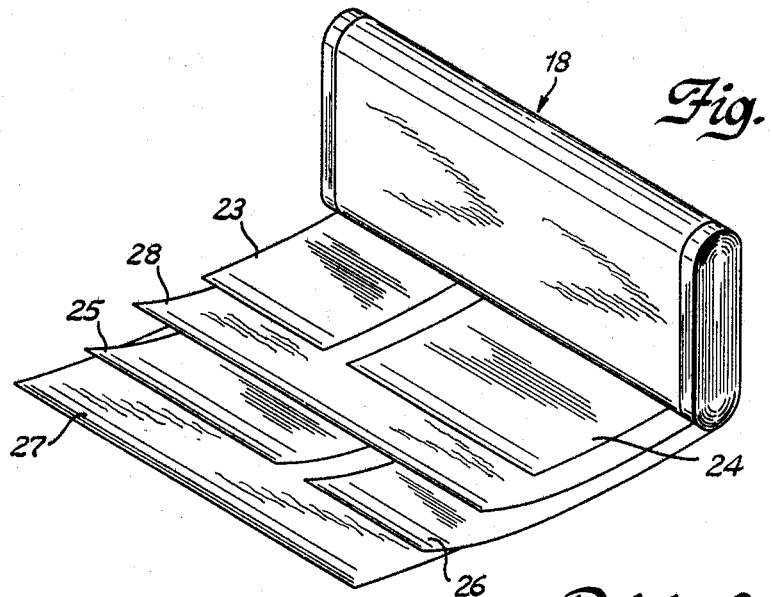
FIG. 3 is an isometric view showing the construction of an individual capacitor pack used in the capacitor illustrated in FIG. 1.

Each of packs 18, 19, 20 and 21 is a three section series wound, flattened pack of the configuration shown in FIGS. 3 and 4. In FIG. 3 pack 18 is illustrated in a partially unrolled state to illustrate laterally separated foils 23 and 24 in one layer and laterally separated foils 25 and 26 in another layer, the layers being separated by insulating sheets 27 and 28. Sheets 27 and 28 may each preferably comprise a plurality of layers of kraft tissue paper. Foils 23 and 26 extend beyond the edges of sheets 27 and 28. Electrical connections are made by soldering to these extending portions of foils 23 and 26. As is best shown in FIG. 4, foil 26 overlaps foil 24 by a distance "A". Similarly, at its other edge foil 24 overlaps foil 25 by distance A, and foil 25 overlaps foil 23 by distance A. The areas of overlap thus formed are the active foil areas and comprise three series connected capacitors. It is this type of construction which defines the term "series wound pack."

Referring again to FIG. 1, each of packs 18, 19, 20 and 21 is shown with three schematically illustrated series connected capacitors representative of the three series connected sections A shown in FIG. 4.

The two center packs 19 and 20 are connected in parallel with the extending foils at their upper ends connected to a header 31 which is, in turn, electrically connected to hub 15 and terminal 11. At the lower ends of packs 19 and 20, the foils extending therefrom are connected to lateral conductor 32. The lower end of pack 18 is connected to conductor 32, and its upper end is connected by a strap 33 to tank 4. Similarly, pack 21 is connected to conductor 32 at its lower end and is connected through a strap 34 to tank 4. Thus, the parallel group of packs consisting of packs 19 and 20 is connected in series with another parallel group of packs consisting of packs 18 and 21. This arrangement of the capacitor elements gives the capacitor 2 the dielectric strength of six capacitances 30 connected in series with the consequent ability to operate at high voltage levels.

The aforedescribed arrangement of packs 18, 19, 20 and 21 also approximates a coaxial current path arrangement within capacitor 2 to minimize inductance. Packs 19 and 20 in parallel form a central conductor extending from terminal 11 to the lower end of capacitor 2, and packs 18 and 21 form separated outer return paths from the lower end of capacitor 2 to the upper end of tank 4 and ground terminals 7.

Major insulation 36 separates the entire pack assembly from the tank 4 and bottom member 5. Major insulation members 37 insulate packs 19 and 20 from packs 18 and 21.

Referring now to FIG. 2, there is shown the conventional approach to building a high voltage low inductance capacitor. Four six-section packs 40, 41, 42 and 43 are connected in parallel between a header 44 and a lower lateral conductor 45 which is, in turn, connected to tank 4. Header 44 is connected to hub 15 and terminal 11. Major insulation 46 insulates the pack assembly from tank 4 and cover 6. Thus, the parallel group of packs 40, 41, 42 and 43 comprises an outgoing central current conducting path, and the tank 4 comprises a substantially coaxial return current path. This substantially coaxial arrangement of current paths results in approximately the same low inductance as the substantially coaxial conductor arrangement shown in FIG. 1.

Each of packs 40, 41, 42 and 43 is constructed and arranged in the manner shown in FIG. 5 wherein pack 40 is shown to have foils 48, 49 and 50 laterally separated in one layer and foils 51, 52, 53 and 54 laterally separated in another layer. Insulating sheets 50, 55 and 56 separate the two layers. Sheets 55 and 56 are assumed to be similar to sheets 28 and 27 in that they are assumed to be able to withstand the same electrical stress and may comprise a plurality of layers of kraft paper tissue.

Pack 40 is also of the extended foil type in that foil 51 extends beyond the edge of sheets 55 and 56 at the top and foil 54 extends below the bottom edges of sheets 55 and 56. Foil 51 overlaps foil 48 by distance $a$, and foil 48 overlaps foil 52 by the same distance $a$. Similarly, foil 52 overlaps foil 49, foil 53 overlaps foil 49 and 50, and foil 54 overlaps foil 50, all by the same distance $a$. Thus, the overlaps thus formed comprise a series connected group of six capacitances shown schematically in FIG. 2 as capacitances 57.

Capacitor 17, therefore, has the dielectric strength of six of capacitances 57 connected in series and may therefore be operated at the same voltage as capacitor 2.

Since the same voltage will appear between each section of pack 40 as will appear between the sections of pack 18, the same lateral separation must exist between the foils of each layer of pack 40 as exist between the foils of each layer of pack 18.

The following analysis will demonstrate that the greater number of series groups within pack 40, as compared to the number of series groups within pack 18, results in greater wasted foil area and consequent lower capacitive volumetric efficiency.

If, for capacitor 17:

$n$ = Number of series sections per pack = 6;
$p$ = Number of parallel capacitor branches = 4;
$C_g$ = Capacitance of one capacitor section arbitrarily let $C_g = a$;
$C_t$ = Total capacitance of capacitor 17 = $pa/n$;
$w$ = width of tissue;
waste = $(n+1) \times$ space between sections arbitrarily let space between sections = $\frac{1}{2}a$;

Then $$a = \frac{w - \text{waste}}{n}$$

$$= \frac{w - (n+1)\frac{1}{2}a}{n}$$

$$= \frac{2w}{3n+1}$$

$$w = \frac{(3n+1)a}{2}$$

And $$C_t = \frac{pa}{n} = \frac{2}{3}a,$$

If, for capacitor 2:

N=Number of series sections per pack=3;
P=Number of parallel capacitor branches=2;
$C_G$=Capacitance of one series group arbitrarily let $C_G$=A;
$C_T$=Total capacitance of capacitor 2=$PA/2N$;
W=Width of tissue=$w$;
waste=$(N+1)\times$space between capacitor sections arbitrarily let space between sections=½$a$;

Then:

$$A = \frac{W - \text{waste}}{N}$$

$$= \frac{w - (N+1)\tfrac{1}{2}a}{N}$$

$$C_T = \frac{P}{2N}A = \frac{A}{3}$$

$$= \frac{w - (N+1)\tfrac{1}{2}a}{3N}$$

$$= \frac{(3n+1)a - (N+1)a}{6N}$$

$$= \frac{19a - 4a}{18} = {}^{15}\!/_{18}a$$

And $$\frac{C_T}{C_t} = \frac{{}^{15}\!/_{18}a}{{}^{2}\!/_{3}a} = 5/4.$$

Thus, it may be seen, that, with the same volume occupied and substantially the same inductance, capacitor 2 has a capacitance which is 25 percent greater than the capacitance of capacitor 17. In capacitor 2, therefore, the ratio of inductance to capacitance or amount of energy stored is lower, and the stored energy may be more quickly released.

FIGS. 6 through 13 show in somewhat greater detail the construction of a modification employing the principles of the present invention.

The capacitor 58 illustrated in FIGS. 8 through 13 demonstrates that the principles of the present invention may be applied to capacitors with a greater number of capacitor packs in parallel and with capacitor packs with a greater number of series sections. In fact, the number of parallel packs and the number of sections per pack is a matter of design choice, depending on the capacitance desired per capacitor assembly and the voltage level at which the capacitor is designed to operate.

Referring to FIG. 6, there is shown a capacitor 58 having a tank 59 with a bottom member 60 and a cover 61 welded thereto in leakproof fashion. A pair of lifting lugs 62 is welded to the upper opposite edges of tank 59. An insulating bushing 63 is mounted in the center of cover 61. A flanged portion 64 of circular shape is embedded in the periphery of bushing 63 and extends outwardly over cover 61 and is welded thereto at its periphery. A ring 65 is attached to the upper surface of flange 64. Ring 65 is provided with a plurality of tapped holes 66 which provide means for attachment to ring 65. Ring 65 may serve as a ground terminal.

In the center of bushing 63 there is imbedded a terminal member 68. Terminal member 68 is fastened to a plate 69 by means of a machine screw 70. Plate 69 is, in turn, fastened to a header 71 which is made of thin conductive metallic material. The head of bolt 70 is covered with a sealing plastic material 72 within the central aperture of terminal 68. All voids and interstices within capacitor 58 are filled with a suitable impregnating material 73 such as castor oil which is inserted during processing through a nipple 74 which is later solder-sealed to complete the total leakproof sealing of capacitor 58.

In the interior of capacitor 58 the outgoing current path comprises a parallel group of eight wound capacitor packs 76 arranged in physically parallel relationship, as shown best in FIGS. 8 and 11. On either side of the outgoing current path comprising packs 76 there are the divided return paths comprising at one side four packs 77 and at the other side four packs 78. Each of packs 76, 77 and 78 is an extended foil six-section series wound capacitor pack constructed as shown in FIGS. 12 and 13 wherein a pack 76 is shown in partially unrolled condition. In FIG. 13 pack 76 is illustrated in the round cylindrical form as wound before flattening. Referring to FIG. 12, pack 76 comprises four laterally spaced foils 79 in one layer and five laterally spaced apart foils 80 in the other layer with insulating sheet means 81 and 82 separating the foil layers. As shown in FIG. 13, insulating sheet means 82 may comprise five separate sheets of kraft tissue paper.

The outermost of foils 80 extend beyond the edges of insulating means 81 and 82 to provide means for connection.

As best shown in FIGS. 6, 9 and 11, the top ends of pack 76 are soldered to header 71. The bottom ends of pack 76 are connected to the bottom ends of packs 78 and 77 by six laterally extending conductive straps 83, as shown in FIG. 10. As best shown in FIGS. 9 and 11, the top ends of pack 77 are connected to tank 56 by conductive straps 84 as shown in FIG. 9. Similarly, the top ends of pack 78 are connected to tank 59 by conductive straps 85.

A major insulating member 86 almost completely surrounds the entire pack assembly and separates it from the capacitor enclosure comprising tank 59, bottom member 60 and cover 61. Major insulating members 87, 88 and 89 separate the outgoing from the return current paths.

It is to be understood that the connections made in the aforedescribed construction are made by soldering to the pack foils and by welding to the tank.

While the aforedescribed embodiments of the invention are effective in accomplishing the stated objectives, it is not intended that the applicant's invention be limited to the disclosed embodiments since they are susceptible of modification without departing from the scope of the appended claims.

What I claim is:
1. A capacitor comprising:
first and second ends;
a plurality of wound capacitor packs each comprising electrically insulated foil separated by electrically insulating sheets;
terminal means comprising terminals of opposite polarities; and
connection means on the ends of each of said packs for making electrical connection to said foils, the connection means for one polarity being at one end of each of said packs and the connection means for the opposite end of each of said packs;
said packs being oriented in parallel fashion with their opposite ends adjacent opposite ends of said capacitor;
said connection means at one end of each of said packs being connected to adjacent connection means of other of said packs at one end of said capacitor, and said connection means at the other ends of said packs being connected to said terminals; and
said packs being connected so as to form first current path means from said first end of said capacitor to said second end of said capacitor, and second current path means from said second end to said first end comprising at least two separated return current path means disposed toward the sides of said capacitor, said first current path means being located substantially centrally between said return current paths.

2. The invention as defined in claim 1 in which said packs comprise series wound packs.

3. The invention as defined in claim 1 in which said packs are wound with extending foils and said connection means are connected to said extending foils.

4. The invention as defined in claim 1 in which said capacitor includes a conductive housing for enclosing said packs.

5. The invention as defined in claim 4 in which said housing comprises one of said terminals.

6. The invention as defined in claim 2 in which said packs are wound with extending foils and said connection means are connected to said extending foils.

References Cited

UNITED STATES PATENTS 3,441,816   4/1969   Butrico _____ 317—260 X

ELLIOTT A. GOLDBERG, Primary Examiner

U.S. Cl. X.R.

317—242

UNITED STATES PATENT OFFICE
CERTIFICATE OF CORRECTION

Patent No. 3,483,453  December 9, 1969

Ralph C. Meyers

It is certified that error appears in the above identified patent and that said Letters Patent are hereby corrected as shown below:

Column 6, line 56, after "posite" insert -- polarity being at the opposite --.

Signed and sealed this 27th day of October 1970.

(SEAL)
Attest:

Edward M. Fletcher, Jr.
Attesting Officer

WILLIAM E. SCHUYLER, JR.
Commissioner of Patents